United States Patent [19]

Niemi

[11] 4,207,761
[45] Jun. 17, 1980

[54] APPARATUS FOR FLANGING CAN BODIES

[75] Inventor: Allan J. Niemi, Castle Rock, Wash.

[73] Assignee: Weyerhaeuser Company, Tacoma, Wash.

[21] Appl. No.: 966,934

[22] Filed: Dec. 6, 1978

[51] Int. Cl.² ............................................. B21D 22/06
[52] U.S. Cl. ................................. 72/354; 113/120 M; 113/120 AA
[58] Field of Search ................. 72/367, 354, 360, 361; 113/120 M, 120 Y, 120 AA

[56] References Cited

U.S. PATENT DOCUMENTS

| | | | |
|---|---|---|---|
| 1,774,209 | 9/1930 | Muhlbach | 113/120 Y |
| 3,385,249 | 5/1968 | Czarnecki | 113/120 AA |
| 3,811,306 | 5/1974 | Yoshimura | 113/1 G |

*Primary Examiner*—Leon Gilden

[57] ABSTRACT

A method and apparatus for forming a uniformly sized flange on one end of a can body. The apparatus comprises a plurality of vertically spaced assemblies operating relative to a vertical centerline. A bottom lifter plate serves to position a can body vertically with respect to an annular die assembly. The die assembly has radially slidable segments for abutting the can body and for providing a lip about which the body edge is bent to form the flange. Spaced above the die assembly and movable vertically is a punch assembly which serves to both bend the edge about the annular lip on the die assembly and to move the die segments radially inwardly toward the vertical centerline. After the flange is formed, the lifter plate raises the can body above the top edge of the annular lip after which the die segments are opened and the can body lowered to remove it from the flanging apparatus.

10 Claims, 8 Drawing Figures

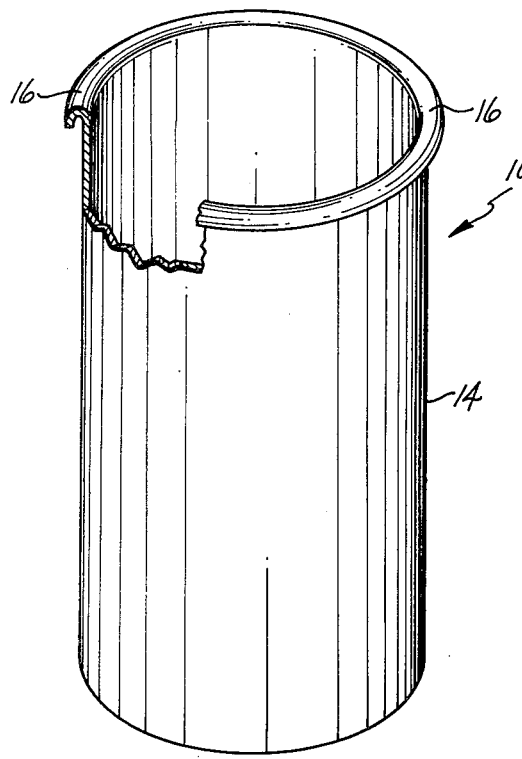
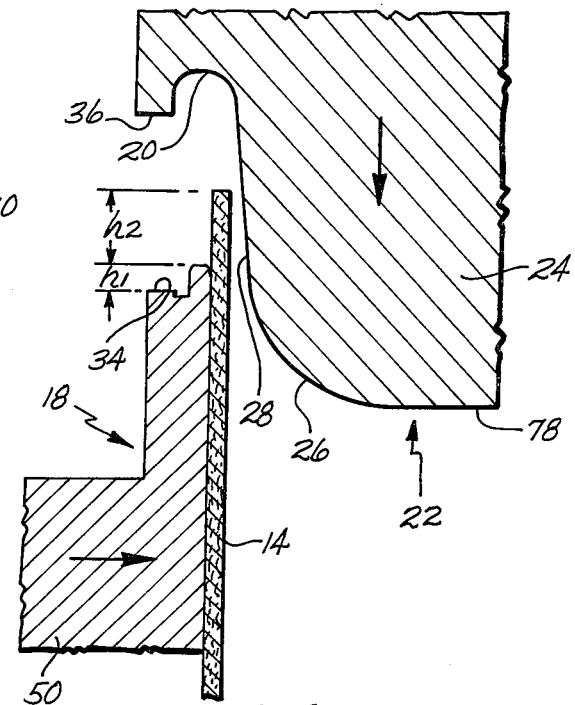
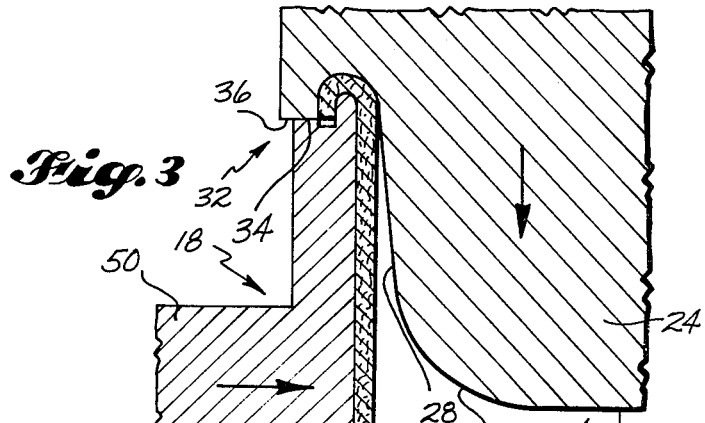
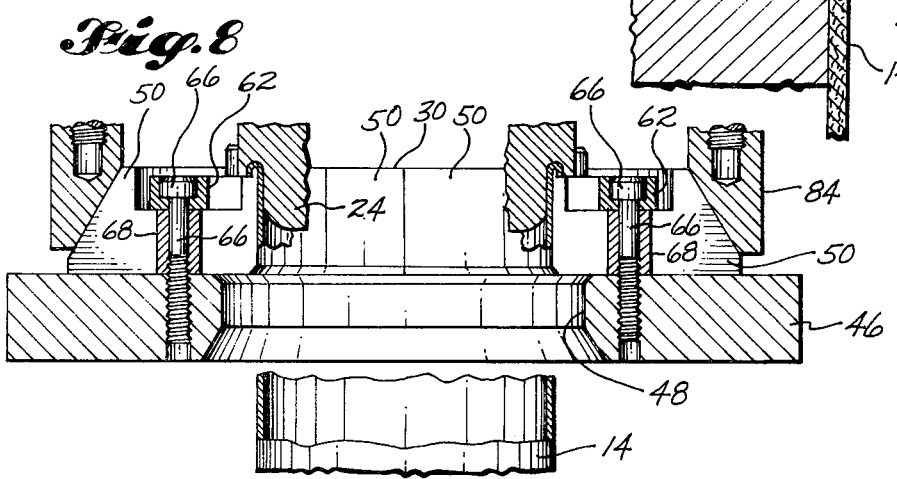

APPARATUS FOR FLANGING CAN BODIES

BACKGROUND OF THE INVENTION

This invention relates generally to a method and apparatus for forming a flange about one end of a can body.

In the manufacture of cans, one typical step in the process is to put on the ends. Part of the end-forming process usually includes the formation of a flange formed from the body material itself which is then utilized as a part of the interlocking mechanism with the can end closure. In the manufacture of typical metal cans, the flange is formed by a rolling process where the edge of the can body is bent by rollers outwardly at a suitable angle in order to form the flanged portion. This flanging process tends to result in nonuniformly formed flanges with wrinkles on the underside that can cause severe problems later when the end closure is formed. The wrinkles tend to result in a poorly formed closure. In addition, the known flanges forming methods and apparatus are limited in production quantities since a circumferential rolling process is required.

Similar problems occur when the can body is comprised of material other than metal such as a paper-plastic composite. When the roll flanging process is utilized, the application of the nonuniform forces results in wrinkles and thereby end closures that tend to be unreliable.

When contemplating an improved flange forming method and apparatus, it is important to consider the adaptability of any new apparatus to the general layout of the overall can manufacturing process. For example, it is typical that the rolled type flanging apparatus consists of a plurality of individual flanging devices mounted about a central column which rotates about a vertical axis. As the central column rotates, each individual device picks up a single can body and roll forms the flange as the entire assembly is rotated. It is not uncommon to have a plurality of twelve such individual flange forming devices mounted about a central column, thereby greatly increasing the capacity. This general machine arrangement is common to the in-line can forming process and, if a faster flange forming process could be developed, ideally it should be mountable on a central column. Therefore, if the new flange forming process is speedier, then a twelve-unit system will produce more flanged can bodies than a comparable twelve-unit roll flanging system. Alternatively, fewer units could be mounted on the central column, thereby reducing the capital cost.

From the foregoing, one object of the present invention is to produce can bodies with uniformly formed flanges.

Another object of the present invention is to produce a flanged can body free from wrinkles in the material.

A further object of the present invention is to form uniform flanges at a high rate of speed.

Still another object of this invention is to provide a flange forming apparatus that is compatible with existing can manufacturing systems.

These and many other objects of the present invention will become apparent upon reading the specification to follow in conjunction with the attached drawings.

BRIEF SUMMARY OF THE INVENTION

Briefly stated, the present invention is practiced in one form by a can body flanging apparatus having means to lift a can body upwardly and to preposition it within a substantially annular die assembly. With the can body prepositioned in the die assembly, an overhead punch assembly is then actuated which has cam means associated therewith to move radially slidable segments in the die assembly to a position abutting the outer surface of the can body. The slidable segments form a lip about which the upper edge of the can body is bent as the punch continues its downward movement. An annular curling groove in the face of the punch forces the edge of the can body to bend about the lip and exerts a pressure against the material to uniformly form the flange. Substantially simultaneously with the lifting of the punch, the can body is lifted vertically by the lifting means to a position where the bottom edge of the flange is above the top edge of the lip. The cam means on the punch assembly then are operable to cause the radially slidable segments to move outwardly allowing the lifting means to move downwardly and carry the now flanged can body out of the flanging assembly.

BRIEF DESCRIPTION OF THE DRAWINGS

FIG. 1 is an isometric view showing a flanged can body with a portion of the flanged end cut away.

FIG. 2 is an enlarged sectional view showing portions of the punch and die assembly as they would be in place just prior to forming the flange.

FIG. 3 is a view similar to FIG. 2 showing the portions of the punch and die assemblies immediately after the flange has been formed.

FIG. 8 is a cross-sectional view taken along line 8—8 of FIG. 7 also showing the die segments in their closed position just prior to the punch being moved upwardly.

DESCRIPTION OF THE BEST MODE OF THE INVENTION AND HOW TO MAKE AND USE IT

Figure 4:
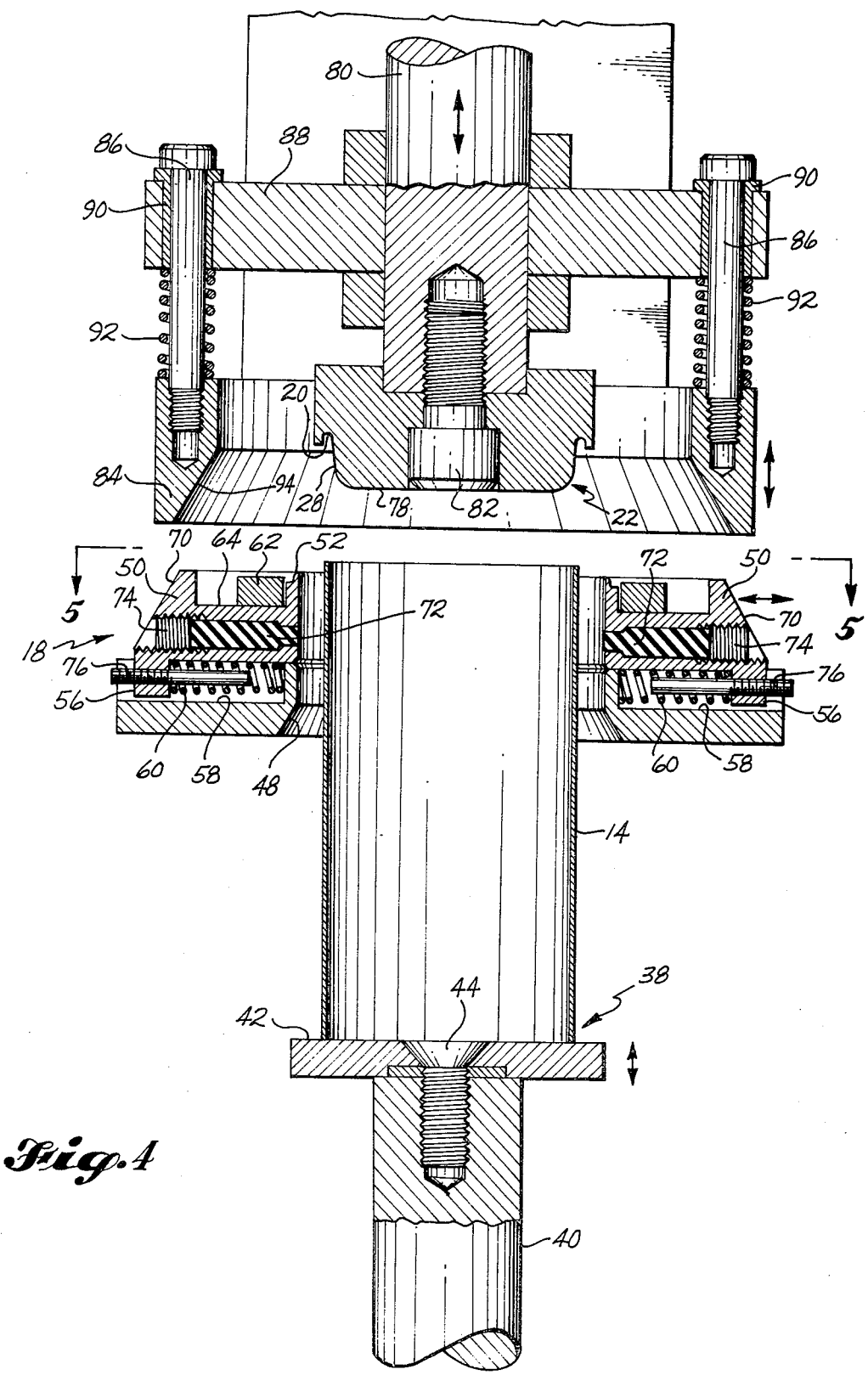
FIG. 4 is a detailed cross-sectional view taken vertically through a flanging assembly showing a can body positioned in place for the flanging process.

Referring first to FIG. 1, a general and brief description will be given of a typical can body having a flange on one end. The flanged can body is generally indicated at 10 and is comprised of a generally circular upstanding body portion 14 together with the flange 16 extending about one end. At the cutaway area shown in FIG. 1 the flange is depicted as being folded back through an angle of approximately 180°. In this configuration, the body material has been bent back and over to form the flange 16 for later can closing purposes. The circumferentially extending underside of the flange 16 when manufactured according to the method and apparatus of the present invention will be free from wrinkles and will be substantially uniform about the circumference.

Referring now to FIGS. 2 and 3, the sequencing of the flange-forming process will be given. A detailed description of the forming assemblies will be given later; however, portions of them will be referred to here in order to clearly set forth the manner in which flange 16 is formed. In FIG. 2 an upstanding body 14 is depicted after it has been prepositioned within the flanging assembly. A substantially annular die assembly generally indicated at 18 abuts a portion of body 14 and functions to support the body during the bending of the upper edge. The die assembly 18 is segmented as will be further described and, in addition to providing the backing function for body 14, they serve to round up any out-of-round can body so as to conform to the annular curling groove 20 within the vertically movable punch assembly generally indicated at 22. The punch itself 24 has a downwardly depending portion 26 that is generally cylindrical in shape, if a circular can body is to be flanged, and has a slightly inclined sidewall 28. The curling groove 20 and inclined sidewall 28 function together and serve to bend the upper edge of can body 14 about a lip 30. The vertical height ($h_1$) of lip 30 is fixed relative to the prepositioned location of can body 14 and it will be appreciated by those skilled in the art that the distance ($h_2$) the can body edge extends above the upper edge of lip 30 together with the depth of annular groove 20 will serve to control in part the cross-sectional dimension of the formed flange 16.

Referring to FIG. 3, in particular, as the punch 24 moves downwardly, it will be appreciated that the upper edge of the body portion 14 will first be impacted by inclined sidewall 28 and, with continued downward movement, the force will cause the body edge to bend about the annular groove 20 and downwardly over the lip 30. While it is not absolutely necessary to the present invention, a stopping means indicated generally at 32 may be provided to bottom out and precisely control the extended position of punch 24. In the embodiment depicted in the drawings, stopping means 32 is comprised of a circumferentially extending horizontal ledge 34 formed as part of die assembly 18 and a coextensive circumferentially extending horizontal ledge 36 on punch assembly 22. Of course, the vertical dimensioning for the positioning of ledges 34 and 36 will be also in part dependent upon the thickness of the body material in that when the punch 24 is in its extended lower position having formed flange 16, the can body material must be accommodated within the spacing between the punch and die assemblies. The material should be uniformly pressed in order to remove or prevent wrinkle formation, but it must not be pressed to such an extent that the material is crushed or otherwise physically deformed. By pressing the formed flange downwardly against the circumferentially extending lip 30, a reactive force will serve to keep the inside surface of the flange free from wrinkles. By controlling the exact positioning of punch 24 through both its actuating means and the use of stopping means 32, precise control of the flange forming process can be obtained.

Turning now to FIG. 4, a more detailed description will be given of the flange forming system and each of the assemblies comprising the system. In addition to die assembly 18 and punch assembly 22, another part of the system includes lifting plate assembly 38. Of course the general function of lifting plate assembly 38 is to accept a can body from a source external to the flanging assembly and to then vertically position it to its predetermined position within die assembly 18. Lifting plate assembly 38 is of any known type suitable for the intended purpose and may include a vertically movable shaft 40 atop which is mounted a circular lifter plate 42. Plate 42 is fixed to shaft 40 through any suitable means such as a screw 44. The diameter of plate 42 is sized according to the size of can body to be flanged. Providing the vertical movement to the plate assembly 38 is any suitable means (not shown) such as a lower cammed mechanism that serves to drive shaft 40 up and down in the proper sequence. Lifting plate assemblies are used in other can manufacturing processes and are vertically driven with known camming mechanisms according to any sequence that is necessary.

It should be pointed out that plate 42 must be movable to a lower position which is spaced an appropriate distance from die assembly 18 in order to allow a can body to be placed atop plate 42. The drive means for shaft 40 must then be functional to move the plate 42 and can body 14 upwardly to a position where the top edge of can body 14 is within die assembly 18 and specifically above the top edge of lip 30. The actual vertical travel distances, of course, depend in part upon the length of can body 14 and $h_1$ and $h_2$.

Figure 5:
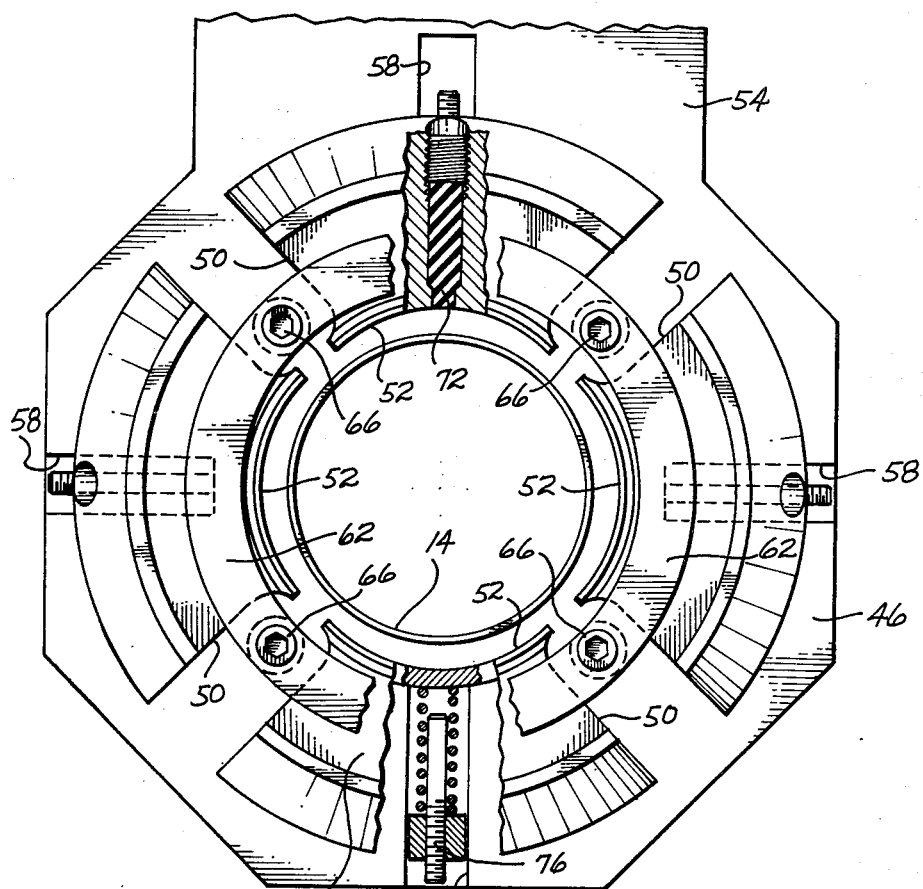
FIG. 5 is a view taken along line 5—5 of FIG. 4 and shows a top plan view of the die assembly partially cut away.
Figure 7:
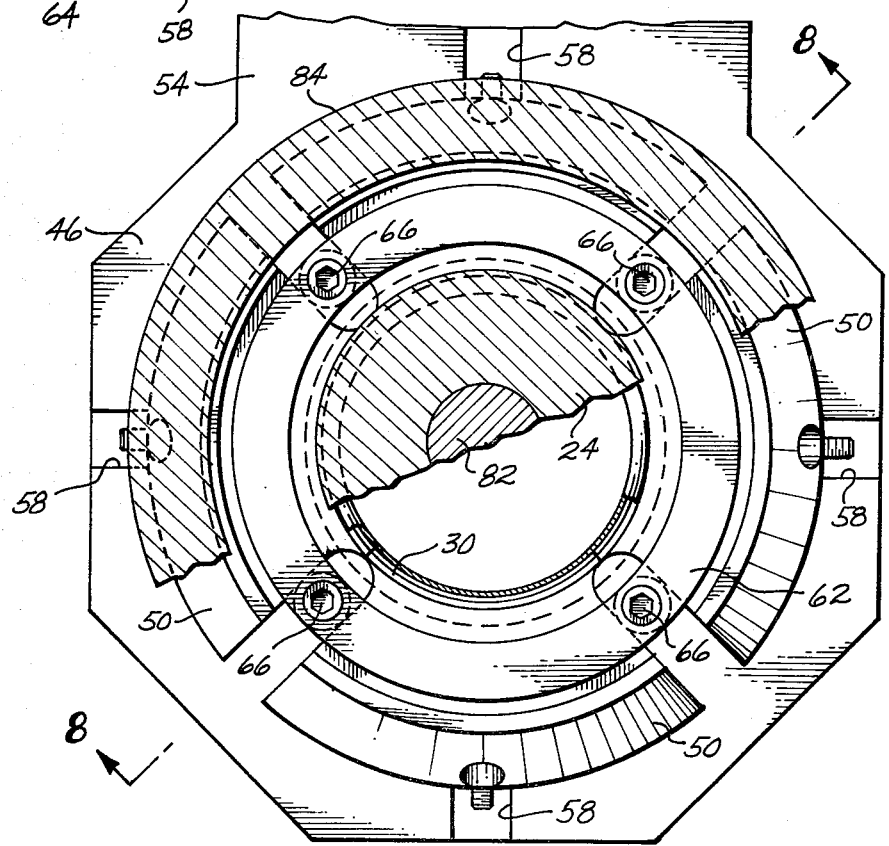
FIG. 7 is a view similar to FIG. 5 taken along line 7—7 of FIG. 6 showing the die segments in their radially innermost positions.
Figure 6:
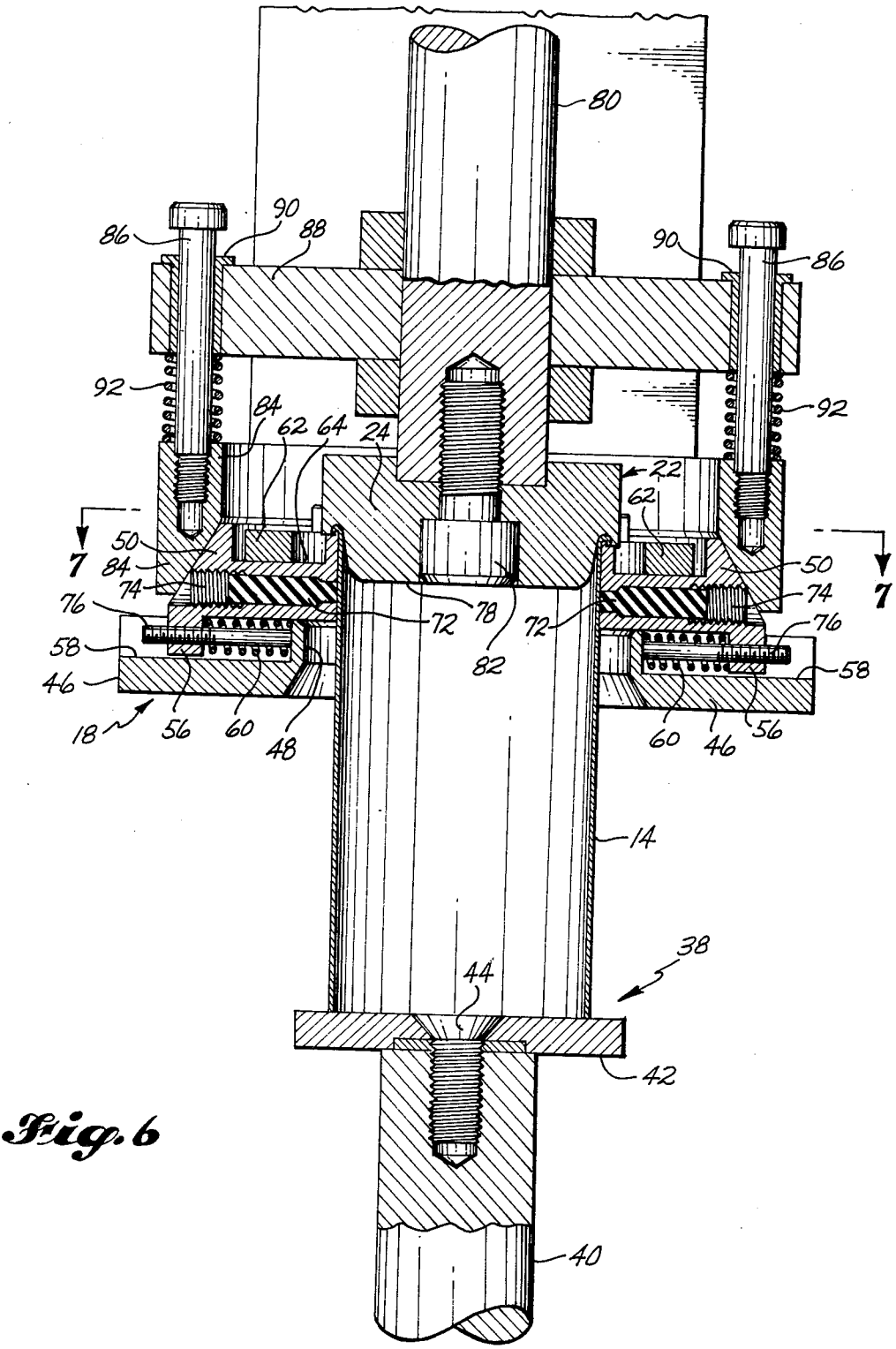
FIG. 6 is a view similar to FIG. 4 showing a sectioned elevation view of the flanging assembly but with the subassemblies being in their extended positions forming the flange.

Turning now to a detailed description of die assembly 18, particular reference will be made to FIGS. 4 and 5. Supporting die assembly 18 in its horizontal and vertical orientation is a fixed base plate 46 having a central opening 48 for passage therethrough of can body 14. Radially slidable atop base plate 46 is a plurality of four spring loaded die segments 50 on which are mounted quarter sections 52 of the circumferentially extending lip 30. Of course it will be appreciated that lip 30 is formed when segments 50 are in their radially innermost positions abutting each other and the outside surface of can body 14. Segments 50 are slidable radially with respect to the vertical axis of the overall flanging apparatus and are extendable between a retracted position as depicted in FIGS. 4 and 5 and the radially extended or innermost position where the circumferentially extending lip 30 is formed as depicted in FIGS. 6, 7 and 8. Base plate 46 may have an outwardly extending extension 54 for mounting on a central rotating column (not shown) if a single flanging assembly is to be mounted so as to be one of a plurality that revolves about a central vertical axis.

In order to restrain the movement of each die segment 50, it should be constructed so as to afford precise movement. For example, with the present embodiment to control in part the lateral radial movement, a downwardly depending guide element 56 extends from the rear of each segment 50 downwardly into a radially extending narrow channel 58 within base plate 46. Guide element 56 and channel 58 together with a radially extending compressible spring 60 form a part of the moving means for radially slidable segments 50. When the segments 50 are in their innermost positions, each spring 60 will be compressed and will be exerting an outward bias on its respective guide element 56 to slide segments 50 outwardly unless otherwise constrained. Serving to limit any vertical movement of segments 50 and to limit their radially outward movement thereby establishing their retracted positions is a circumferentially extending guide ring 62 which is mounted on base plate 46 and elevated therefrom so as to be confined within circumferentially and radially extending channel sections 64 within each slidable die segment 50. Between segments 50 along the radially extending sides, bolts 66 extend downwardly through guide ring 62 and into base plate 46. Serving to support bolts 66 in part and to establish the vertical distance between base plate 46 and guide ring 62 is a plurality of spacer elements 68 associated with each bolt 66 (see FIG. 8). As depicted in FIG. 5, when segments 50 are in their retracted positions, springs 60 will serve to force each segment outwardly to a position where the circumferentially extending front faces of channels 64 will be abutting the circumferentially extending inner face of guide ring 62 (see FIG. 4). Forming another part of the moving means for radially sliding segments 50 is the circumferentially extending inclined back edge 70 of each segment 50. Edge 70 is a cam surface and, whenever a generally vertical force is exerted thereon, the segment will be caused to slide radially inwardly.

Serving to limit in part the radially inward movement of segments 50 are threaded stop bolts 76 which extend through each of the guide elements 56 and through springs 60 to a position where they will be spaced in order to abut the front edge of narrow channel 58, thereby stopping the inward movement of a segment 50. By changing the position of stop bolts 76, the relative radial position of the inner curvilinear face of each segment 50 can be controlled.

Positioned within each segment 50 and extending radially inwardly from back edge 70 and terminating within the front curvilinear face thereof which abuts the can body is an insert 72. Insert 72 may be comprised of any suitable material such as rubber having a high coefficient of friction and they provide a restraining force on the can body material as will become more apparent later. Inserts 72 are held in place by headless bolts 74 so as to not interfere with the cam function of back edge 70.

Turning now to a detailed description of the punch assembly 22, reference will be made particularly to FIGS. 4, 6 and 7. Extending across the lowermost portion of the downwardly depending portion 26 of punch 24 is the face 78. The punch 24 is fixed to vertically movable shaft 80 through an upwardly extending central bolt 82. The bolt 82, of course, allows punch 24 to be easily detached and replaced with either a new one or one of a different size. The upper end of movable shaft 80 terminates at the punch drive means (not shown) which may include an annular cam mechanism which causes the shaft 80 to move up and down sequentially at the proper time in operative communication with the sequenced movement of bottom shaft 40. The working surfaces of punch 24, that is, the inclined sidewall 28 and the curling groove 20, are usually of smooth polished metal as will be recognized by those skilled in the art.

Mounted on shaft 80 is the vertically movable, spring biased circular cam 84. Circular cam 84 is positioned relative to punch 24 by a plurality of downwardly extending holding bolts 86 which are slidably mounted in an upper circular supporting ring 88. The plurality of bolts 86, for example four, are mounted in bushings 90 within supporting ring 88 together with a plurality of vertical springs 92. The springs 92 are mounted about bolts 86 and extend between the bottom surface of ring 88 and a part of the top horizontal surface of circular cam 84. It should be appreciated that the shaft 80 will carry both punch 24 and supporting ring 88 through the same vertical distance and, when circular cam 84 bottoms out, the punch will still continue downwardly with the supporting ring 88 having an upward bias exerted by springs 92. The actual cam surface 94 of circular cam 84 is inclined at an angle so as to be in operative communication with the back edges 70 of slidable die segments 50. As shaft 80 moves downwardly, it will cause cam surface 94 to impact the back edge 70 of each slidable segment 50, and since springs 92 are selected to maintain the position of circular cam 84 as it is moved downwardly and to overcome the sliding friction of segments 50 plus the bias from springs 60, causing segments 50 to move radially inwardly. Segments 50 slide to their extended innermost positions where the circumferentially extending lip 30 will be formed as will the circumferentially extending vertical backing face for the upper portion of can body 14. Shaft 80 then continues its downward movement while circular cam 84 remains in place moving punch 24 into the required relationship with the top edge of a can body causing the necessary bending and pressing.

A description will now be given of the operating sequence of the actual flange forming process. First, the elements of all assemblies are in their retracted positions with shaft 40 being in its lowermost position while shaft 80 is in its uppermost position. The segments 50 are in their retracted positions being spring biased. At a can body entry station, a single can body is placed atop plate 42. Shaft 40 is then actuated to move upwardly to preposition can body 14 within the die assembly 18 with the upper edge at the proper vertical distance $h_2$ above lip 30. Thereafter, the shaft 80 will be actuated to move downwardly first causing the circular cam 84 to slide the die segments 50 inwardly to their extended positions, thereby forming lip 30 and rounding up the upper portion of the body 14. The shaft 80 continues to move downwardly and the punch 24 then begins the bending operation by impacting the upper edge of the can body. The upper edge is forced to bend around annular curling groove 20 and over the lip 30 where flange 16 is uniformly pressed. The flange now being completely formed, the shaft 80 then is actuated to move upwardly to begin release of the can body. Substantially simultaneously therewith the shaft 40 begins to move upwardly lifting the bottom edge of flange 16 above the edge of lip 30. The continued upward movement of shaft 80 then begins to move circular cam 84 upwardly, supporting ring 88 having contacted the heads of bolts 86, thereby allowing springs 60 to slide segments 50 outwardly toward their retracted positions. The shaft 80 continues its upward movement to its retracted position allowing the circular cam 84 to move to its elevated position above the die assembly 18. Once the flanged can body is free of the elements in die assembly 18, shaft 40 will be actuated to move downwardly carrying the flanged can body to a position below the die assembly where it can then be removed from the flanging assembly.

While a detailed description has been given of the preferred embodiment, it will be recognized by those skilled in the art that various modifications can be made to what has been described and it is intended that all such modifications are to be included within the scope of the appended claims.

I claim:

1. An apparatus for forming a flange on a can body, comprising:

means to move an unflanged can body upwardly for prepositioning within a substantially annular die assembly, a vertically movable punch assembly having a curling groove in the face of a punch substantially coextensive with the top edge of a prepositioned can body, a plurality of radially slidable segments within the die assembly abutting at least a portion of the upper outer surface of the can body and forming a substantially annular lip extending about the circumference of the can body at a vertical elevation below the top edge of the can when the segments are in their radially innermost positions means for moving the punch downwardly whereby when the curling groove impacts the top edge of the can body it will bend the edge over the lip as it continues downwardly, and means supplemental to the radially slidable segments for restraining movement of the can body when the segments are in their radially innermost positions.

2. An apparatus as in claim 1 further including means for moving the punch upwardly after the flange is formed on the can.

3. An apparatus as in claim 2 including means to move the flanged can body upwardly to a position where the bottom edge of the flange is above the vertical elevation of the lip.

4. An apparatus as in claim 3 including means for retracting the segments to their radially outermost positions.

5. An apparatus as in claim 4 including means for lowering the flanged can body to a position without the die assembly.

6. An apparatus as in claim 1 including a plurality of spring means for urging the segments toward their outermost positions.

7. An apparatus as in claim 1 including a cam means for sliding the segments inwardly to their positions abutting the can body.

8. An apparatus as in claim 7 in which a portion of the cam means is spring mounted on the punch assembly.

9. An apparatus as in claim 7 in which a portion of each segment forms a cam follower of the cam means.

10. An apparatus as in claim 1 in which the restraining means includes a plurality of rubber inserts extending through the segments and abutting the can body.

* * * * *